United States Patent
Okamoto et al.

(10) Patent No.: US 11,821,539 B2
(45) Date of Patent: Nov. 21, 2023

(54) GAS SOLENOID VALVE

(71) Applicant: KAWASAKI JUKOGYO KABUSHIKI KAISHA, Kobe (JP)

(72) Inventors: Masayoshi Okamoto, Kobe (JP); Makoto Ninomiya, Kobe (JP); Hiroshi Yamashita, Kobe (JP); Noritaka Nakamura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 109 days.

(21) Appl. No.: 17/427,278

(22) PCT Filed: Jan. 28, 2020

(86) PCT No.: PCT/JP2020/002969
§ 371 (c)(1),
(2) Date: Jul. 30, 2021

(87) PCT Pub. No.: WO2020/158728
PCT Pub. Date: Aug. 6, 2020

(65) Prior Publication Data
US 2022/0128165 A1    Apr. 28, 2022

(30) Foreign Application Priority Data

Jan. 31, 2019 (JP) .................. 2019-015885

(51) Int. Cl.
*F16K 31/06* (2006.01)
*F16K 27/02* (2006.01)
*F16K 47/02* (2006.01)

(52) U.S. Cl.
CPC ........ *F16K 31/0675* (2013.01); *F16K 27/029* (2013.01); *F16K 31/0655* (2013.01); *F16K 47/02* (2013.01)

(58) Field of Classification Search
CPC . F16K 1/301; F16K 1/42; F16K 1/523; F16K 27/029; F16K 31/06;
(Continued)

(56) References Cited

U.S. PATENT DOCUMENTS 2,384,977 A * 9/1945 Swearingen .............. F16K 1/42
251/360
5,048,790 A * 9/1991 Wells .................... F16K 31/408
251/44

(Continued)

FOREIGN PATENT DOCUMENTS

JP    H09292049 A    11/1997
JP    2003222261 A    8/2003
(Continued)

*Primary Examiner* — Matthew W Jellett
(74) *Attorney, Agent, or Firm* — Alleman Hall Creasman & Tuttle LLP (57) ABSTRACT

A gas solenoid valve includes: a housing; a main valve body; a guide member; a first biasing member that is disposed in a housing space formed inward of the guide member to surround the main valve body and biases the main valve body in an opening direction; a second biasing member; and an electromagnetic drive device. The housing space is spaced apart from one end of the guide member in the opening direction. A buffer groove is formed at the one end of the guide member to surround an opening end of an inner hole of the guide member.

4 Claims, 8 Drawing Sheets

(58) Field of Classification Search
CPC ............. F16K 31/0675; F16K 31/0655; F16K 31/0696; F16K 31/0693; F16K 31/1226; F16K 31/42; F16K 31/408; F16K 47/02; F17C 13/04; F17C 2205/0326; F17C 2205/0382; F17C 2205/0385; F17C 2205/0394; F17C 2223/0123; F17C 2223/036
USPC .................................. 251/30.04, 48–55, 359
See application file for complete search history.

(56) References Cited

U.S. PATENT DOCUMENTS

| | | | |
|---|---|---|---|
| 5,735,582 A * | 4/1998 | Eith | B60T 8/4872 251/30.01 |
| 5,810,330 A | 9/1998 | Eith et al. | |
| 6,443,420 B1 * | 9/2002 | Hettinger | F16K 39/024 251/38 |
| 9,347,580 B2 * | 5/2016 | Ninomiya | F16K 31/0675 |
| 9,929,417 B2 * | 3/2018 | Nakamura | H01M 8/04089 |
| 10,006,559 B2 * | 6/2018 | Kubo | F16K 31/408 |
| 2003/0151018 A1 * | 8/2003 | Teshima | F16K 25/00 251/332 |
| 2013/0175462 A1 * | 7/2013 | Suzuki | F16K 39/024 251/30.01 |
| 2013/0306891 A1 | 11/2013 | Fietz et al. | |
| 2021/0101573 A1 | 4/2021 | Edelmann et al. | |

FOREIGN PATENT DOCUMENTS

| | | |
|---|---|---|
| JP | 3787392 B2 | 6/2006 |
| KR | 20140034407 A | 3/2014 |
| WO | 2018197103 A1 | 11/2018 |

* cited by examiner

GAS SOLENOID VALVE

TECHNICAL FIELD

The present invention relates to gas solenoid valves that are electromagnetically-driven on/off valves.

BACKGROUND ART

Gas solenoid valves are provided to open and close channels through which gas flows; as an example, a solenoid valve such as that disclosed in Patent Literature (PTL 1) is known.

CITATION LIST

Patent Literature

PTL 1: Japanese Laid-Open Patent Application Publication No. 2003-222261

SUMMARY OF INVENTION

Technical Problem

For example, there are cases where a solenoid valve is provided on a gas tank, and the solenoid provided on the gas tank is used as follows. Specifically, in the case of filling the gas tank with gas, gas pressure causes a main valve to be lifted off a valve seat, thus opening a channel. At this time, chattering occurs at the main valve, etc., causing various problems such as noise, damage to a seat, and contamination attributable to wear and tear.

Thus, the present invention has an object to provide a gas solenoid valve in which the occurrence of chattering at a main valve body is minimized.

Solution to Problem

A gas solenoid valve according to the first invention includes: a housing including a first port, a second port, and a valve port leading to the first port and the second port; a main valve body capable of moving between a closed position and an open position and configured to move in an opening direction by pressure of gas supplied through the first port, the closed position being a position of the main valve body closing the valve port, the open position being a position of the main valve body opening the valve port; a guide member disposed having one end facing the valve port, the guide member including an inner hole in which the main valve body is inserted to guide the main valve body between the closed position and the open position; a first biasing member that is disposed in a housing space and biases the main valve body in the opening direction, the housing space being formed inward of the guide member to surround the main valve body; a second biasing member that provides, to the main valve body, a biasing force opposing a biasing force of the first biasing member to position the main valve body in the closed position; and an electromagnetic drive device that generates an excitation force to cause the main valve body to move to the open position, the excitation force opposing the biasing force of the second biasing member. The housing space is spaced apart from the one end of the guide member in the opening direction. A buffer groove is formed at the one end of the guide member to surround an opening end of the inner hole of the guide member.

According to the present invention, gas flowing along an outer peripheral surface of the main valve body can be released into the buffer groove, and it is possible to prevent a situation in which a large quantity of gas flows in between the main valve body and the guide member. This makes it possible to minimize abrupt fluctuations in the internal pressure in the housing space, minimizing the occurrence of chattering at the main valve body.

In the above-described invention, it is preferable that the gas solenoid valve further include a seat piston that is inserted through the main valve body, receives the biasing force of the second biasing member, and biases the main valve body to the closed position, a pilot passage connecting the first port and the second port be formed in the main valve body, the seat piston be capable of moving between a pilot closed position, which is the position of the seat piston closing the pilot passage, and a pilot open position, which is the position of the seat piston opening the pilot passage, and the electromagnetic drive device generate the excitation force to cause the seat piston to move to the pilot open position, to cause the main valve body to move to the open position.

According to the above configuration, by causing the electromagnetic drive device to generate an excitation force, it is possible to open the valve port, allowing gas to flow from the second port to the first port. Even in such a gas solenoid valve that allows bidirectional flows, the occurrence of chattering at the main valve body can be minimized.

In the above-described invention, it is preferable that a depressurization passage be formed in at least one of the main valve body and the guide member, and the depressurization passage be formed to allow the gas in the housing space to be discharged.

According to the above configuration, gas that has flown into the housing space can be discharged; in other words, the housing space can be depressurized. This makes it possible to minimize abrupt fluctuations in the internal pressure in the housing space, minimizing the occurrence of chattering at the main valve body.

In the above-described invention, it is preferable that the guide member include at least one communication channel to guide, to the second port, the gas guided through the valve port opened, and at least one communication channel be formed at the one end of the guide member and arranged to make the distribution of flow rates of the gas flowing in the at least one communication channel asymmetric at the one end of the guide member.

According to the above configuration, it is possible to exert, on the main valve body, load that presses the main valve body against the guide member when the gas flows. Thus, the sliding resistance of the main valve body can be increased. This makes it possible to minimize vibrations of the main valve body, minimizing the occurrence of chattering at the main valve body.

A gas solenoid valve according to the second invention includes: a housing including a first port, a second port, and a valve port leading to the first port and the second port; a main valve body capable of moving between a closed position and an open position and configured to move in an opening direction from the closed position toward the open position by pressure of gas supplied through the first port, the closed position being a position of the main valve body closing the valve port, the open position being a position of the main valve body opening the valve port; a guide member disposed having one end facing the valve port, the guide member including an inner hole in which the main valve body is inserted to guide the main valve body between the closed position and the open position; a first biasing member that is disposed in a housing space and biases the main valve body in the opening direction from the closed position toward the open position, the housing space being formed inward of the guide member to surround the main valve body; a second biasing member that provides, to the main valve body, a biasing force opposing a biasing force of the first biasing member to position the main valve body in the closed position; and an electromagnetic drive device that generates an excitation force to cause the main valve body to move to the open position, the excitation force opposing the biasing force of the second biasing member. A depressurization passage is formed in at least one of the main valve body and the guide member. The depressurization passage is formed to allow the gas in the housing space to be discharged.

According to the present invention, gas that has flown into the housing space can be discharged; in other words, the housing space can be depressurized. This makes it possible to minimize abrupt fluctuations in the internal pressure in the housing space, minimizing the occurrence of chattering at the main valve body.

A gas solenoid valve according to the third invention includes: a housing including a first port, a second port, and a valve port leading to the first port and the second port; a main valve body capable of moving between a closed position and an open position and configured to move in an opening direction from the closed position toward the open position by pressure of gas supplied through the first port, the closed position being a position of the main valve body closing the valve port, the open position being a position of the main valve body opening the valve port; a guide member disposed having one end facing the valve port, the guide member including an inner hole in which the main valve body is inserted to guide the main valve body between the closed position and the open position; a first biasing member that is disposed in a housing space and biases the main valve body in the opening direction from the closed position toward the open position, the housing space being formed inward of the guide member to surround the main valve body; a second biasing member that provides, to the main valve body, a biasing force opposing a biasing force of the first biasing member to position the main valve body in the closed position; and an electromagnetic drive device that generates an excitation force to cause the main valve body to move to the open position, the excitation force opposing the biasing force of the second biasing member. The guide member includes at least one communication channel to guide, to the second port, the gas guided through the valve port opened. At least one communication channel is formed at the one end of the guide member and arranged to make a distribution of flow rates of the gas flowing from the valve port to the at least one communication channel asymmetric at the one end of the guide member.

According to the present invention, it is possible to exert, on the main valve body, load that presses the main valve body against the guide member when the gas flows. Thus, the sliding resistance of the main valve body can be increased. This makes it possible to minimize vibrations of the main valve body, minimizing the occurrence of chattering at the main valve body.

A gas solenoid valve according to the fourth invention includes: a housing including a first port, a second port, and a valve port leading to the first port and the second port; a main valve body capable of moving between a closed position and an open position and configured to move in an opening direction by pressure of gas supplied through the first port, the closed position being a position of the main valve body closing the valve port, the open position being a position of the main valve body opening the valve port; a guide member disposed having one end facing the valve port, the guide member including an inner hole in which the main valve body is inserted to guide the main valve body between the closed position and the open position; a first biasing member that is disposed in a housing space and biases the main valve body in the opening direction, the housing space being formed inward of the guide member to surround the main valve body; a second biasing member that provides, to the main valve body, a biasing force opposing a biasing force of the first biasing member to position the main valve body in the closed position; and an electromagnetic drive device that generates an excitation force to cause the main valve body to move to the open position, the excitation force opposing the biasing force of the second biasing member. The housing space is spaced apart from the one end of the guide member in the opening direction. The main valve body closes the valve port by causing one end of the main valve body to protrude from the guide member. A buffer space is formed in the housing to surround the one end of the main valve body.

According to the present invention, gas flowing along the outer peripheral surface of the main valve body can be released into the buffer space, and it is possible to prevent a situation in which a large quantity of gas flows in between the main valve body and the guide member. This makes it possible to minimize abrupt fluctuations in the internal pressure in the housing space, minimizing the occurrence of chattering at the main valve body.

Advantageous Effects of Invention

With the present invention, it is possible to minimize the occurrence of chattering at the main valve body.

The above object, other objects, features, and advantages of the present invention will be made clear by the following detailed explanation of preferred embodiments with reference to the attached drawings.

DESCRIPTION OF EMBODIMENTS

Hereinafter, gas solenoid valves 1, 1A-1C according to Embodiments 1-4 of the present invention will be described with reference to the drawings. Note that the concept of directions mentioned in the following description is used for the sake of explanation and is not intended to limit the orientations, etc., of elements according to the present invention to these directions. The gas solenoid valves 1, 1A-1C described below are merely one embodiment of the present invention. Thus, the present invention is not limited to the embodiments and may be subject to addition, deletion, and alteration within the scope of the essence of the present invention.

Embodiment 1

Figure 1:
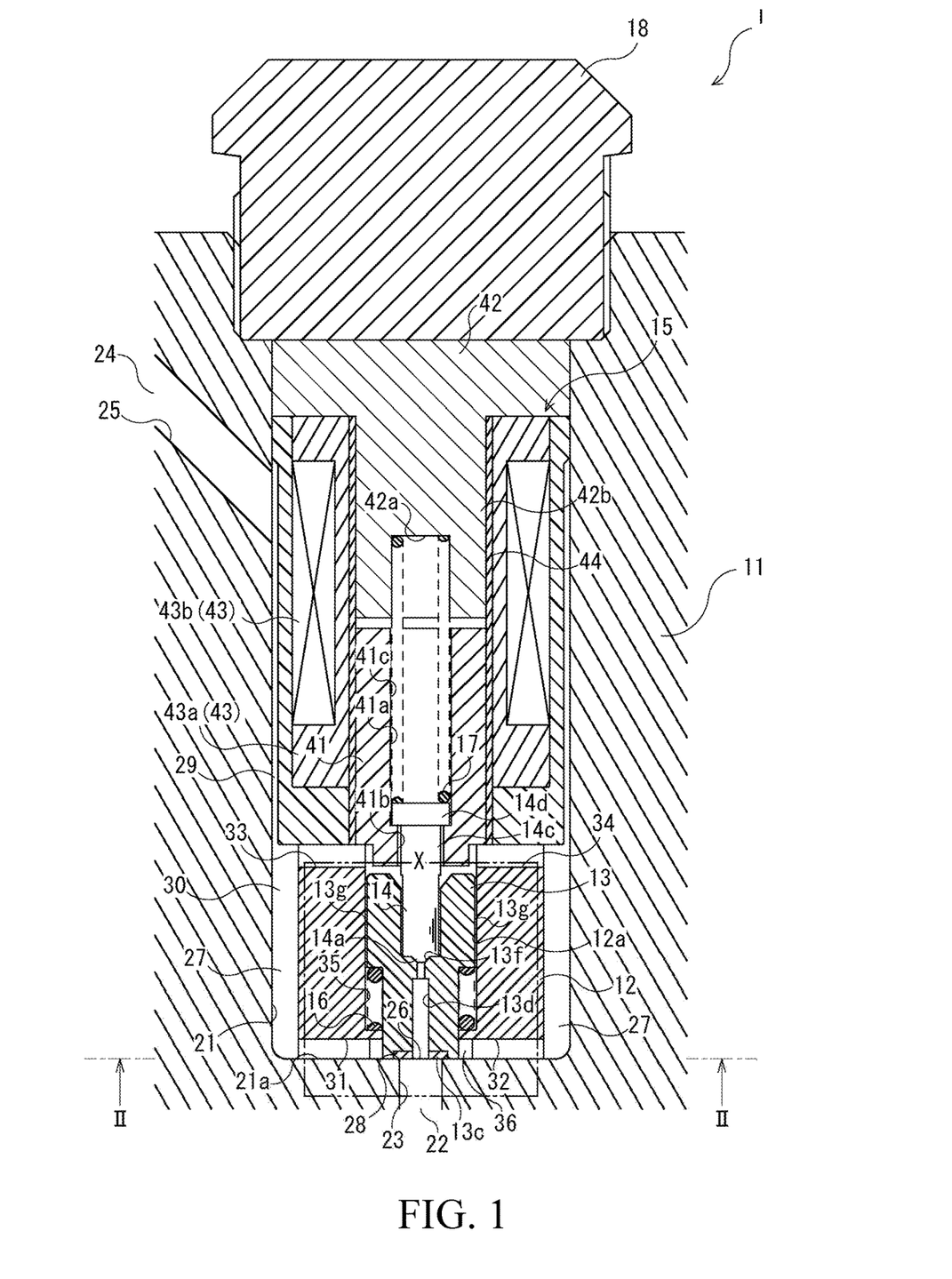
FIG. 1 is a cross-sectional view of a gas solenoid valve according to Embodiment 1 of the present invention.

A gas solenoid valve 1 illustrated in FIG. 1 is provided on a gas tank or the like that can hold a high pressure gas, and the gas solenoid valve 1 enables gas filling and discharge by opening and closing a channel. Note that the gas tank is one example for which the gas solenoid valve 1 is used, and a subject for which the gas solenoid valve 1 is used is not necessarily limited to the gas tank. Specifically, the gas solenoid valve 1 is provided in a channel required to allow gas to flow in both directions. The gas solenoid valve 1 having such a function is configured as follows.

Specifically, the gas solenoid valve 1 mainly includes a housing 11, a guide member 12, a main valve body 13, a seat piston 14, and an electromagnetic drive device 15. In the housing 11, a valve chamber 21 in the approximate shape of a circular column having a closed end is formed, and an opening part of the valve chamber 21 is covered by a lid body 18. Furthermore, a first channel 23 leading to a first port 22 and a second channel 25 leading to a second port 24 are formed in the housing 11. The first channel 23 is open at a bottom 21a of the valve chamber 21 via a valve port 26, and the second channel 25 is open in a side surface of the valve chamber 21. The housing 11 configured as just described houses the guide member 12, the main valve body 13, the seat piston 14, and the electromagnetic drive device 15 in the valve chamber 21 in order to open and close the valve port 26.

Figure 2:
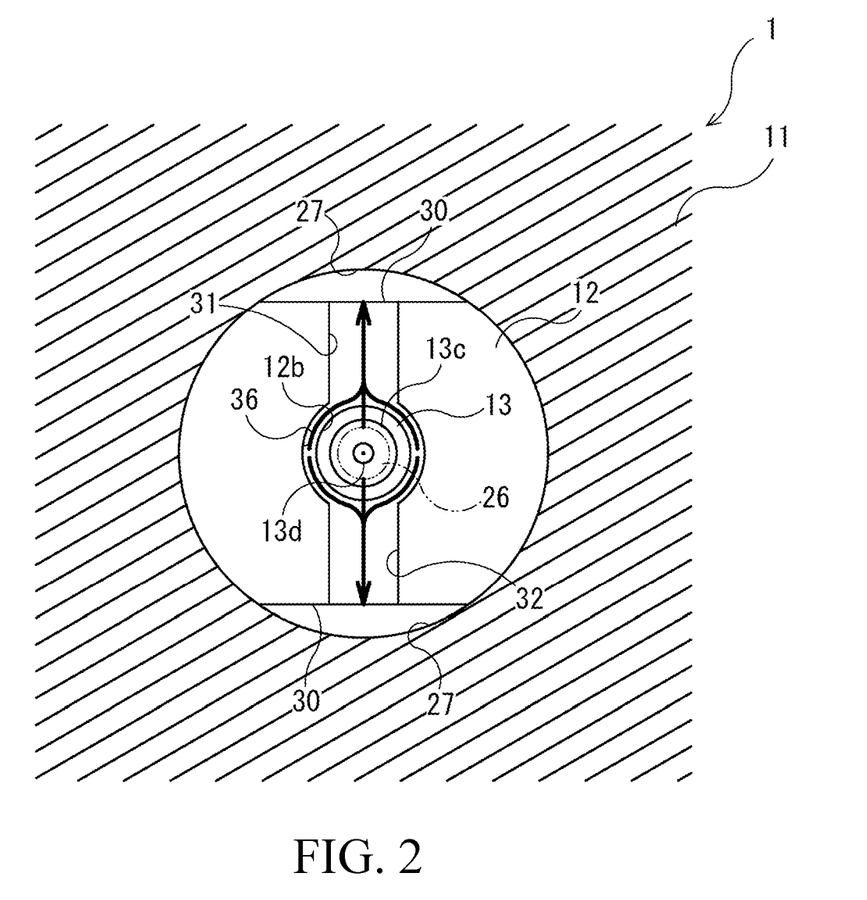
FIG. 2 is an enlarged cross-sectional view of the gas solenoid valve taken along cutting plane line II-II in FIG. 1.
Figure 3:
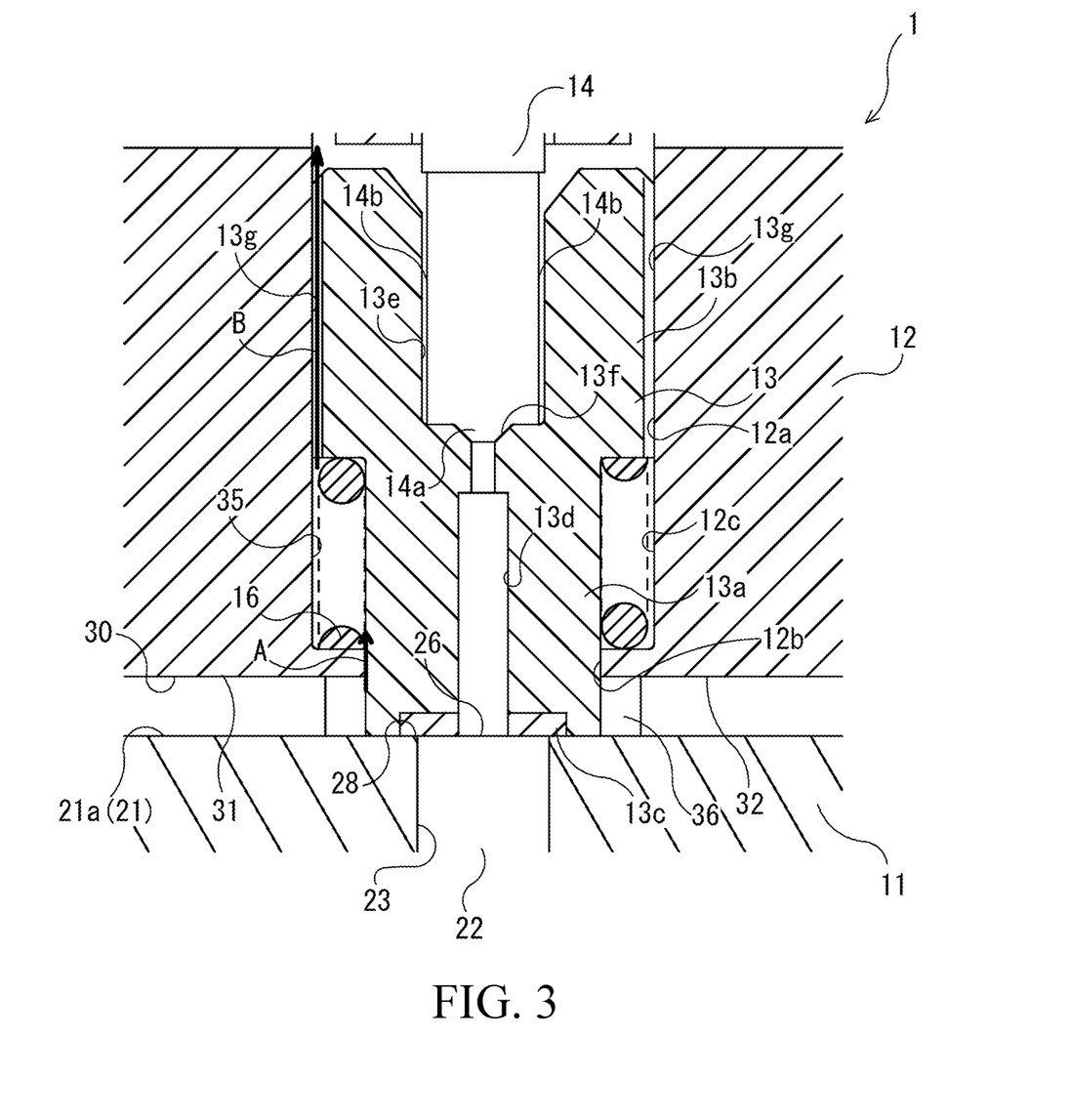
FIG. 3 is an enlarged cross-sectional view illustrating an enlarged view of a region X in FIG. 1.

The guide member 12 is formed in the approximate shape of a circular cylinder, and at least a portion of the outer peripheral surface of the guide member 12 (in the present embodiment, two portions separated from each other by 180 degrees in the peripheral direction) is formed to be flat. The guide member 12 shaped as just described fits into the valve chamber 21 with one end in contact with the bottom 21a of the valve chamber 21, and forms one pair of gaps 27, 27 with the housing 11. Furthermore, two communication channels 31, 32 are formed at one end of the guide member 12, as illustrated in FIG. 2. The two communication channels 31, 32 extend in opposite directions along the radius of an inner hole 12a of the guide member 12 so as to be arranged in a straight line, and connect the valve port 26 and the gaps 27, 27. Similarly, two communication channels 33, 34 are formed at the other end of the guide member 12, and the gaps 27, 27 and the inner hole 12a of the guide member 12 are connected by communication channels 33, 34. Furthermore, the main valve body 13 is inserted into the inner hole 12a, as illustrated in FIG. 3.

The main valve body 13 is formed in the approximate shape of a circular cylinder having a closed end with a base end portion 13b larger in diameter than a leading end portion 13a. The base end portion 13b of the main valve body 13 shaped as just described fits into the inner hole 12a and can move axially along the inner hole 12a of the guide member 12. Furthermore, the main valve body 13 can be in a closed position such as that illustrated in FIG. 1 and includes a seat member 13c on a leading end surface. When the main valve body 13 is in the closed position, the seat member 13c is seated on a valve seat 28, and thus the valve port 26 is closed. On the other hand, when the main valve body 13 is placed in an open position by moving axially in the opposite direction, the seat member 13c separates from the valve seat 28, and thus the valve port 26 is opened.

The main valve body 13 configured as described above forms a housing space 35 with the guide member 12 in order to house a first coil spring 16. Specifically, in the guide member 12, the inner hole 12a has one end portion 12b formed smaller in diameter than a remaining portion 12c, and the leading end portion 13a of the main valve body 13 is inserted through the one end portion 12b. Thus, the housing space 35 in the approximate shape of a circular ring is formed between the leading end portion 13a of the main valve body 13 and the guide member 12, and the first coil spring 16 is housed in the housing space 35. The first coil spring 16, which is one example of the first biasing member, is what is called a compression coil spring and provides, to the main valve body 13, a biasing force in an opening direction from the closed position to the open position. Note that the first coil spring 16 can be replaced by a leaf spring, an elastic body, a magnetic spring, a pneumatic spring, a pressing mechanism that uses an electrostatic force, or the like.

Furthermore, in the main valve body 13, a pilot passage 13d is formed to allow communication between the first port 22 and the second port 24 when the main valve body 13 is in the closed position. The pilot passage 13d passes through the main valve body 13 along the axial line thereof, and when the main valve body 13 is seated, connects the valve port 26 and an inner hole 13e of the main valve body 13. Moreover, in order to open and close the pilot passage 13d, the seat piston 14 is inserted through the inner hole 13e of the main valve body 13 in such a manner as to be axially movable.

The seat piston 14 is formed in the approximate shape of a circular column, and closes the pilot passage 13d by inserting a leading end 14a of the seat piston 14 into a seat portion 13f of the pilot passage 13d and causing the leading end 14a to be seated. In other words, as a result of the seat piston 14 being positioned in a pilot closed position, the pilot passage 13d is closed. Furthermore, the seat piston 14 can move from the pilot closed position to a pilot open position along the axial line of the seat position 14, and when the seat piston 14 moves, the leading end 14a separates from the seat portion 13f. Accordingly, the pilot passage 13d is opened, and the valve port 26 and the inner hole 13e of the main valve body 13e are brought into communication. Furthermore, a plurality of slits (in the present embodiments, two slits) 14b, 14b are formed in the outer peripheral surface of the seat piston 14, and the slits 14b, 14b form channels connecting the pilot passage 13d and the aforementioned two communication channels 33, 34 when the pilot passage 13d is open. The seat piston 14 configured as just described has a base end portion 14c protruding from the main valve body 13, and the electromagnetic drive device 15 is provided on this protrusion.

The electromagnetic drive device 15 includes a plunger 41, a stationary pole 42, and a solenoid 43. The plunger 41 is a member in the approximate shape of a circular cylinder that is made of a magnetic material, and the base end portion 14c of the seat piston 14 is inserted through an inner hole 41a of the plunger 41. Furthermore, in the inner hole 41a, a leading end portion 41b is formed smaller in diameter than the base end portion 41c, and accordingly a base end 14d of the seat piston 14 is formed larger in diameter than the remaining portion. Thus, the plunger 41 engages the base end 14*d* of the seat piston 14 at the leading end portion of the inner hole 41*a* of the plunger 41 and is configured to move in conjunction with the seat piston 14. The stationary pole 42 is provided so as to face the plunger 41 configured as just described.

The stationary pole 42 is a member in the approximate shape of a circular column that is made of a ferromagnetic material and is disposed apart from the base end of the plunger 41 in one axial direction. The outer diameter of a leading end portion 42*b* of the stationary pole 42 disposed as just described is approximately equal to the outer diameter of the plunger 41, and a sleeve 44 is provided surrounding the leading end portion 42*b* of the stationary pole 42 and the plunger 41. The sleeve 44 is a member in the approximate shape of a circular cylinder that is made of a non-magnetic material and is configured so that the plunger 41 can move axially in the sleeve 44. The solenoid 43 is provided surrounding the sleeve 44 configured as just described.

The solenoid 43 is formed in the approximate shape of a circular column and can generate an excitation force for the plunger 41 by passing an electric current to a coil 43*b* wound on a bobbin 43*a*. Specifically, the solenoid 43 can excite the plunger 41 so that the plunger 41 is attracted to the stationary pole 42, and thus can move the seat piston 14, which moves in conjunction with the plunger 41, to the pilot open position by the attraction. Furthermore, in order to provide a biasing force opposing the excitation force to the plunger 41 (more specifically, to the plunger 41 via the seat piston 14), a second coil spring 17 is provided on the plunger 41.

The second coil spring 17, which is one example of the second basing member, is what is called a compression coil spring and is inserted through the plunger 41. The second coil spring 17 has one end fitted into a spring bearing recess 42*a* of the stationary pole 42 and the other end pressed against the base end 14*d* of the seat piston 14. Therefore, the second coil spring 17 biases the plunger 41 via the seat piston 14 in one axial direction and pulls the plunger 41 away from the stationary pole 42. Furthermore, as a result of being pressed against the seat piston 14, the second coil spring 17 enables the plunger 41 and the seat piston 14 to move in conjunction with each other, and positions the seat piston 14 in the pilot closed position in the state where no electric current flows through the solenoid 43. Note that the second coil spring 17 can be replaced by a leaf spring, an elastic body, a magnetic spring, a pneumatic spring, a pressing mechanism that uses an electrostatic force, or the like.

The outer peripheral surface of the solenoid 43 is formed larger in diameter at the base end than at the remaining portion, and an annular channel 29 in the shape of a circular ring is formed between the remaining portion and the housing 11. The annular channel 29 is connected to the second port 24 via the second channel 25, is connected to the first port 22 via the gaps 27, 27, the communication channels 31, 32, and the first channel 23, and forms a valve passage 30 together with these channels 23, 25, 27, 27, 31, 32.

In the gas solenoid valve 1 configured as described above, the guide member 12 and the main valve body 13 are configured as follows. Specifically, a buffer groove 36 is formed at one end of the guide member 12, as illustrated in FIG. 2. The buffer groove 36 is formed so as to exteriorly surround an opening end of the inner hole 12*a* of the guide member 12 and is formed in the shape of a ring (in the present embodiment, the approximate shape of a circular ring). The depth of the buffer groove 36 is approximately equal to the depth of each of the two communication channels 31, 32 in the present embodiment, meaning that gas flowing in the buffer groove 36 is guided to the communication channels 31, 32 without stagnation. Note that the depth of the buffer groove 36 does not necessarily need to be equal and may be more than or less than the depth of each of the two communication channels 31, 32.

Furthermore, in the main valve body 13, a plurality of depressurization passages (in the present embodiment, two depressurization passages) 13*g*, 13*g* are formed at the base end portion 13*b*, as illustrated in FIG. 3. The depressurization passages 13*g*, 13*g*, which are slits formed in the outer peripheral surface of the base end portion 13*b* of the main valve body 13, are formed, for example, by making the outer peripheral surface flat in at least two places. The depressurization passages 13*g*, 13*g* formed as just described extend axially in the base end portion 13*b* of the main valve body 13 and can discharge the gas in the housing space 35 to the two communication channels 33, 34.

Figure 4:
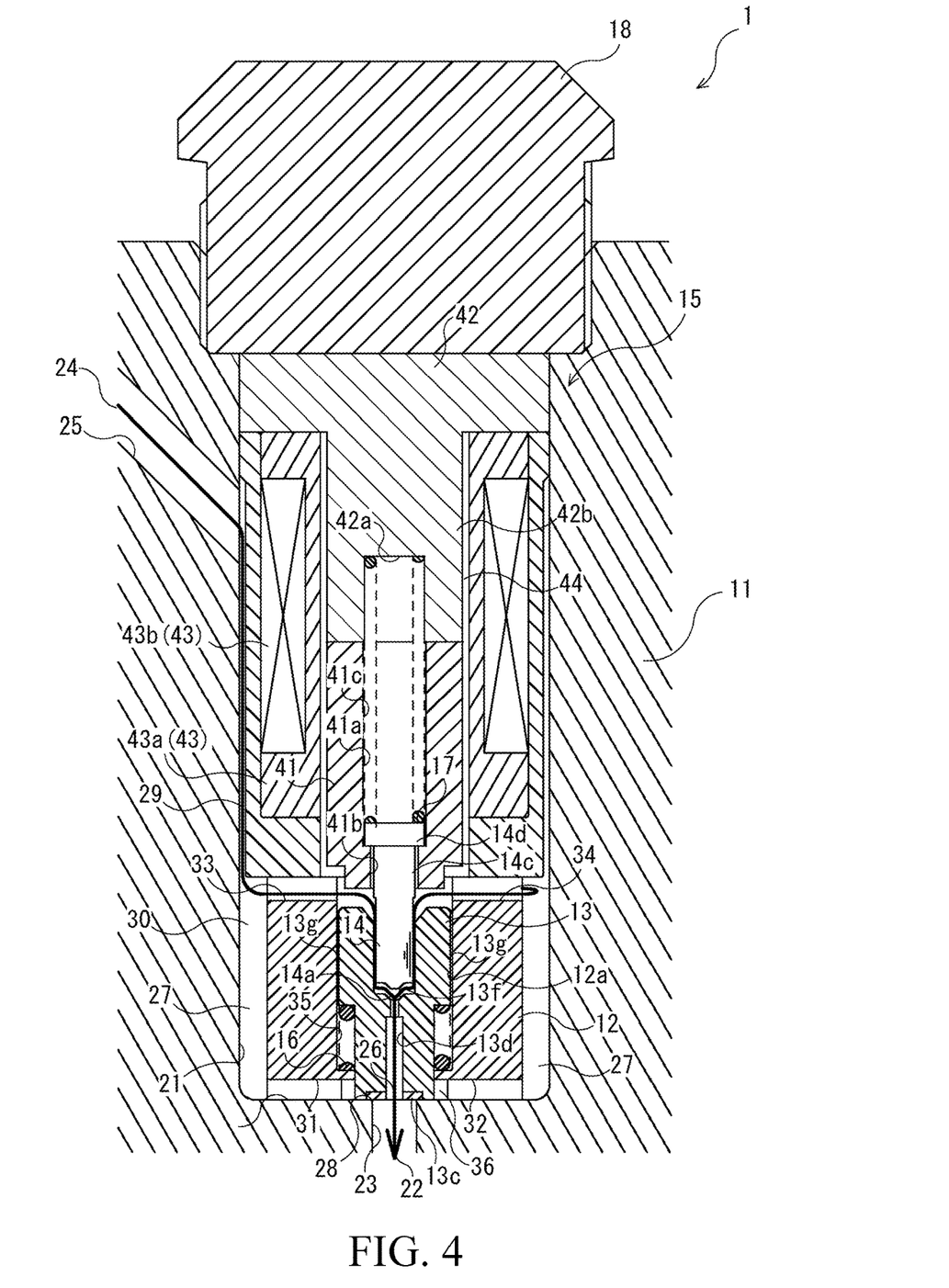
FIG. 4 is a cross-sectional view of the gas solenoid valve in FIG. 1 when gas is supplied from a second port to a first port.

The operation of the gas solenoid valve 1 will be described below. Specifically, as mentioned above, the gas solenoid valve 1 is provided on the gas tank and can cause the gas to flow in both directions in the valve passage 30 in order to fill the gas tank with the gas and discharge the gas from the gas tank, for example. For example, to cause the gas to flow from the second port 24 to the first port 22 as illustrated in FIG. 4, an electric current flows to the coil 43*b* of the solenoid 43. Therefore, the plunger 41 is lifted up, and the seat piston 14 moves to the pilot open position accordingly. Thus, the pilot passage 13*d* is opened, and the gas is guided to the first channel 23 through the two communication channels 33, 34, the slits 14*b*, 14*b*, and the pilot passage 13*d*. As a result, the difference in pressure between the gas in the valve chamber 21 and the gas flowing in the first channel 23 is reduced, and the main valve body 13 is eventually pushed up to the open position by the first coil spring 16. Thus, the valve port 26 is opened, meaning that the valve passage 30 is opened, and the gas flows from the second port 24 to the first port 22 via the valve passage 30. Subsequently, when the electric current stops flowing to the coil 43*b*, the second coil spring 17 pushes the main valve body 13 via the seat piston 14, and the main valve body 13 moves to the closed position. Thus, the valve port 26 is closed, meaning that the valve passage 30 is closed, and the gas stops flowing.

Figure 5:
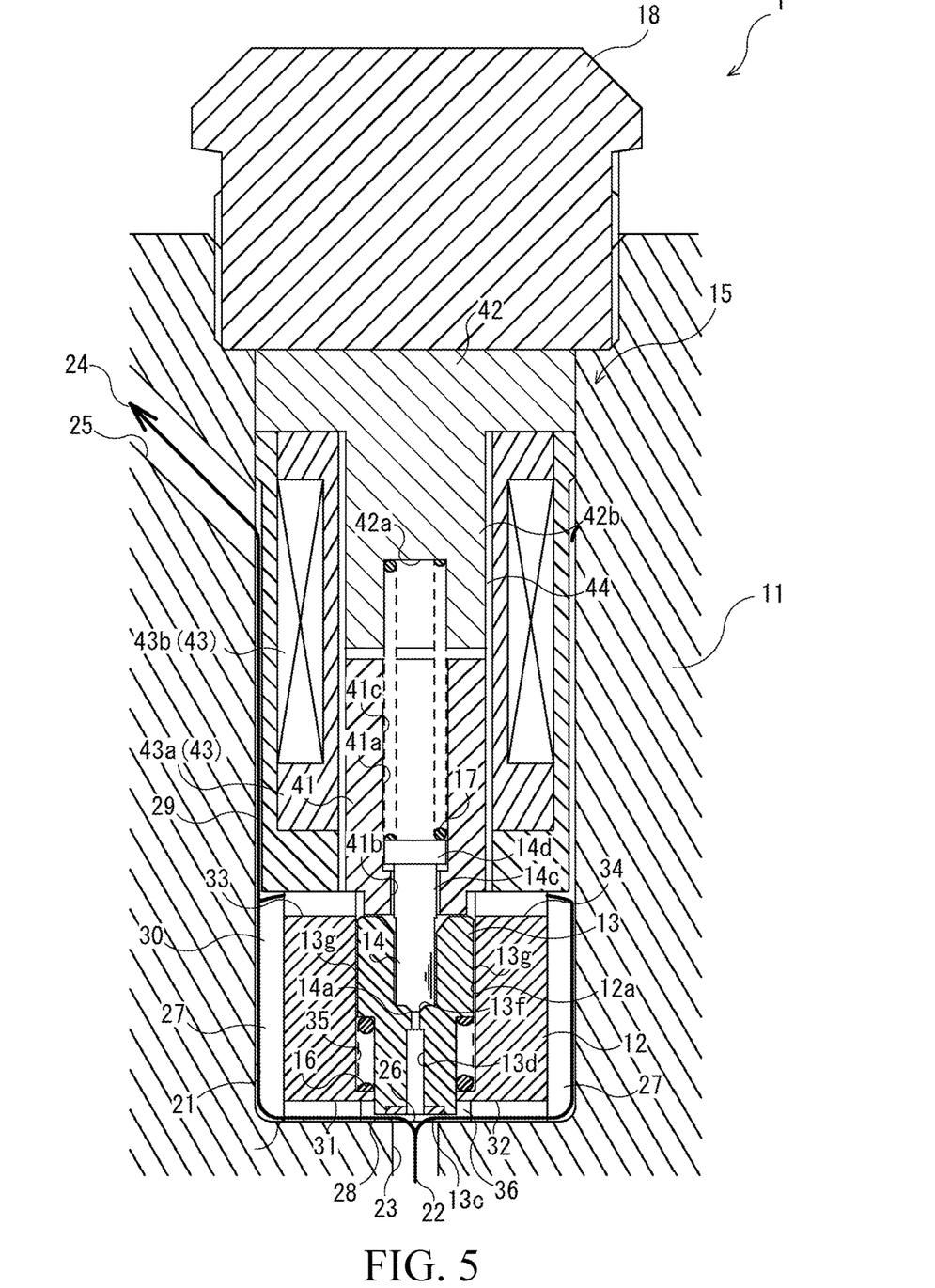
FIG. 5 is a cross-sectional view of the gas solenoid valve in FIG. 1 when gas is supplied from the first port to the second port.

On the other hand, to cause the gas to flow from the first port 22 to the second port 24 as illustrated in FIG. 5, the gas solenoid valve 1 operates as follows. Specifically, when the gas flows from the first port 22 to the first channel 23, the main valve body 13 is pushed in the opening direction by the pressure of the gas. Thus, the main valve body 13 moves to the open position, and the valve port 26 is opened, meaning that the valve passage 30 is opened. As a result, the gas flows mainly from the first channel 23 to each of the communication channels 31, 32 through the valve port 26, and is guided further to the second channel 25 through the gaps 27, 27 and the annular channel 29. The gas supplied to the first port 22 in this manner is guided to the second port 24 via the valve passage 30. Furthermore, the gas, although small in quantity, also flows as follows. Specifically, a small quantity of the gas that has passed through the valve port 26 flows along the outer peripheral surface of the main valve body 13, passes between the main valve body 13 and the guide member 12, and flows into the housing space 35 (for example, refer to the arrow A in FIG. 3). This increases the internal pressure in the housing space 35, and movement of the main valve body 13 in this state causes abrupt fluctuations in the internal pressure in the housing space 35, resulting in chattering at the main valve body 13. Regarding this issue, in the gas solenoid valve 1, the occurrence of chattering at the main valve body 13 is minimized in the following manner.

Specifically, in the gas solenoid valve 1, the buffer groove 36 is formed at one end of the guide member 12 as mentioned above, and the gas flowing along the outer peripheral surface of the main valve body 13 can be guided to the buffer groove 36 and thus flow to each of the communication channels 31, 32 (refer to the arrow in FIG. 2). Therefore, it is possible to prevent a situation in which a large quantity of gas flows in between the main valve body 13 and the guide member 12 and the internal pressure in the housing space 35 increases. This make it possible to minimize abrupt fluctuations in the internal pressure in the housing space 35, minimizing the occurrence of chattering at the main valve body 13.

Furthermore, in the gas solenoid valve 1, as mentioned above, the two depressurization passages 13g, 13g are formed, and gas that has flown into the housing space 35 can be discharged to the valve passage 30 via the communication channels 33, 34, in other words, the housing space 35 can be depressurized (for example, refer to the arrow B in FIG. 3). This makes it possible to minimize abrupt fluctuations in the internal pressure in the housing space 35, minimizing the occurrence of chattering at the main valve body 13.

In the above-described manner, in the gas solenoid valve 1, by supplying gas from the first port 22 to the first channel 23, it is possible to open the valve port 26 and cause the gas to flow to the second port 24, and at this time, the occurrence of chattering at the main valve body 13 can be minimized. Furthermore, by stopping the gas supply from the first port 22 to the first channel 23, the main valve body 13 is pushed by the second coil spring 17 and moves to the closed position as in the case where the gas flows from the second port 24. Thus, the valve port 26 is closed, meaning that the valve passage 30 is closed, and the gas stops flowing. In the gas solenoid valve 1, it is possible to cause gas to flow from both the first port 22 and the second port 24 as described above.

Embodiment 2

A gas solenoid valve 1A according to Embodiment 2 is similar in configuration to the gas solenoid valve 1 according to Embodiment 1. Therefore, the configuration of the gas solenoid valve 1A according to Embodiment 2 will be described focusing on differences from the gas solenoid valve 1 according to Embodiment 1; elements that are the same as those of the gas solenoid valve 1 according to Embodiment 1 share the same reference signs, and as such, description of the elements will be omitted. Note that the same applies to a gas solenoid valve 1B according to Embodiment 3 to be described later.

Figure 6:
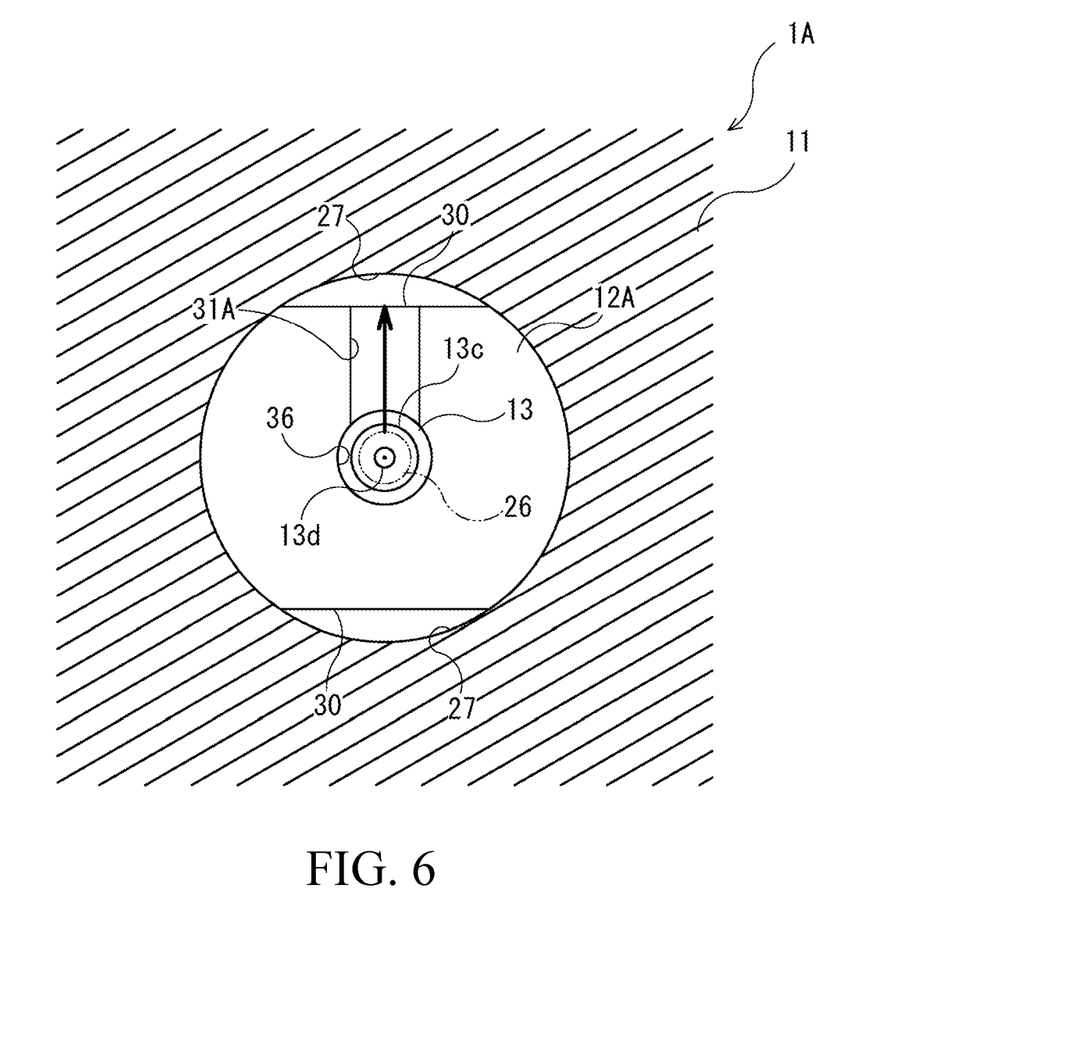
FIG. 6 is a cross-sectional view of a gas solenoid valve according to Embodiment 2 of the present invention.

In the gas solenoid valve 1A according to Embodiment 2, a guide member 12A is configured in the manner described below, as illustrated in FIG. 6. Specifically, one communication passage 31A is formed at one end of the guide member 12A and extends radially outward from the inner hole 12a to one of the gaps 27. With this, the distribution of flow rates of gas flowing at the one end of the guide member 12A is asymmetric with respect to the center axis of the guide member 12A, and it is possible to exert, on the main valve body 13, load that presses the main valve body 13 against the guide member 12A when the gas flows. Thus, the sliding resistance of the main valve body 13 can be increased. This makes it possible to minimize vibrations of the main valve body 13, minimizing the occurrence of chattering at the main valve body 13.

Aside from this, the gas solenoid valve 1A according to Embodiment 2 produces substantially the same advantageous effects as the gas solenoid valve 1 according to Embodiment 1.

Embodiment 3

Figure 7:
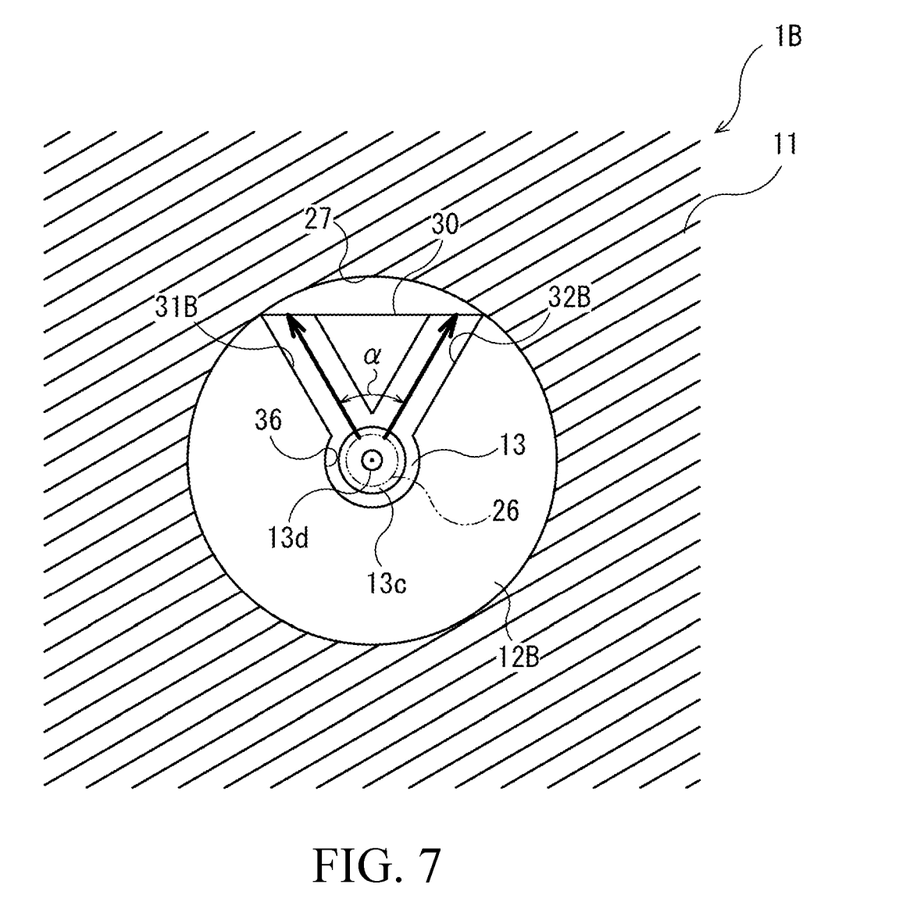
FIG. 7 is a cross-sectional view of a gas solenoid valve according to Embodiment 3 of the present invention.

In a gas solenoid valve 1B according to Embodiment 3, a guide member 12B is configured in the manner described below, as illustrated in FIG. 7. Specifically, two communication channels 31B, 32B are formed at one end of the guide member 12B. The two communication channels 31B, 32B extend radially outward from the inner hole 12a to the gap 27 and are arranged to form a predetermined angle α ($15° \leq α < 180°$; in the present embodiment, $α=60°$), instead of being arranged in a straight line. Thus, as in the case of the guide member 12A, the distribution of flow rates of gas flowing at the one end of the guide member 12B is asymmetric with respect to the center axis of the guide member 12B, and it is possible to exert, on the main valve body 13, load that presses the main valve body 13 against the guide member 12B when the gas flows. This makes it possible to minimize the occurrence of chattering at the main valve body 13.

Aside from this, the gas solenoid valve 1B according to Embodiment 3 also produces substantially the same advantageous effects as the gas solenoid valve 1 according to Embodiment 1.

Embodiment 4

Figure 8:
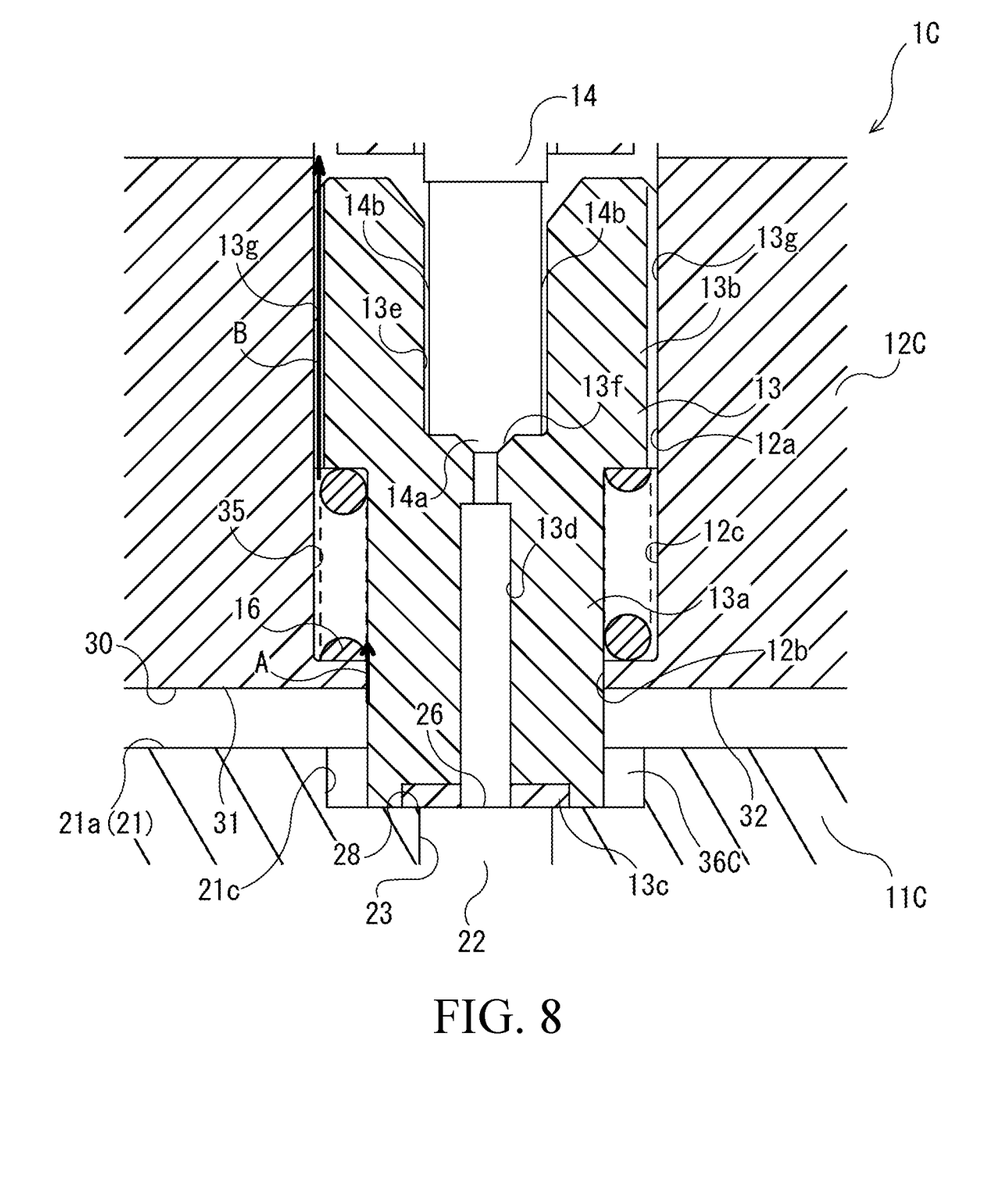
FIG. 8 is a cross-sectional view of a gas solenoid valve according to Embodiment 4 of the present invention.

In a gas solenoid valve 1C according to Embodiment 4, a guide member 12C does not include the buffer groove 36, and a buffer space 36C is formed in a housing 11C, as illustrated in FIG. 8. Specifically, in the housing 11C, a recess 21c is formed in the bottom 21a of the valve chamber 21, and the valve port 26 is formed in a bottom portion of the recess 21c. The main valve body 13 in the closed position is seated on the valve seat 28 in the state of protruding from the guide member 12C into the recess 21c. The inner diameter of the recess 21c is greater than the outer diameter of the main valve body 13, and the buffer space 36C is formed around the main valve body 13. The buffer space 36C is formed in the approximate shape of a circular ring and is connected to the communication channels 31, 32. Therefore, the buffer space 36C has substantially the same functions as those of the buffer grooves 36 according to Embodiments 1-3. Thus, the gas solenoid valve 1C according to Embodiment 4 also produces substantially the same advantageous effects as the gas solenoid valve 1 according to Embodiment 1.

Other Embodiments

In the gas solenoid valves 1, 1A-1C according to Embodiments 1-4, the depressurization passages 13g, 13g are formed by making the outer peripheral surface flat in at least two places, but do not necessarily need to be formed in such a manner. For example, the depressurization passages 13g, 13g may be thin grooves, the shape of which is not limited. Alternatively, the depressurization passages 13g, 13g may be communication holes formed in the main valve bodies 13, 13A or the guide members 12, 12A-12C. For example, the communication holes may be formed in the main valve bodies 13, 13A so as to bring the housing space 35 and the pilot passage 13d into communication, or may be formed in the guide members 12, 12A-12C so as to bring the housing space 35 and the gap 27 into communication. Furthermore, the depressurization passages 13g, 13g do not necessarily need to be formed; even with the buffer groove 36 only, it is possible to minimize the occurrence of chattering at the main valve body 13. Meanwhile, the buffer groove 36 and the buffer space 36C do not necessarily need to be formed; even with the depressurization passages 13g, 13g only, it is possible to minimize the occurrence of chattering at the main valve body 13.

Furthermore, in the gas solenoid valves 1, 1A-1C according to Embodiments 1-4, the same applies to the communication channel formed at one end of each of the guide members 12, 12A-12C; the number of communication channels does not necessarily need to be one or two and may be three or more. Moreover, in the case of increasing the sliding resistance of the main valve body 13 as in the gas solenoid valves 1A, 1B according to Embodiments 2 and 3, the communication channels may be configured as follows. Specifically, a plurality of communication channels may be asymmetrically arranged (more specifically, the plurality of communication channels are not required to be β communication channels arranged at an angle of 360/β degrees (in other words, deviating by an equal angle)), each of the plurality of communication channels may have a different depth and a different width, or the plurality of communication channels may include throttles on the downstream side. In other words, it is sufficient that the plurality of communication channels be arranged to make the distribution of flow rates of gas flowing at one end of the guide member 12 asymmetric with respect to the center axis of the guide member 12.

In each of the gas solenoid valves 1, 1A-1C according to Embodiments 1-4, the seat piston 14 is provided, but is not necessarily required; the gas solenoid valve may be configured so that the plunger 41 is directly pressed against the main valve body 13. The main valve body 13 does not necessarily need to include the seat member 13c; the seat member 13c may be formed on the housing 11 side. The main valve body 13 itself may be formed of the same material as the seat member 13c. The seat member 13c is rectangular in cross-section, but may be circular in cross-section or may be shaped to have a curved surface.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTERS LIST 1, 1A, 1B gas solenoid valve
11, 11C housing
12, 12A-12C guide member
12a inner hole
12b one end portion
13 main valve body
13d pilot passage
13g depressurization passage
14 seat piston
15 electromagnetic drive device
16 first coil spring
17 second coil spring
22 first port
24 second port
26 valve port
31, 31A, 31B communication channel
32, 32B communication channel
35 housing space
36 buffer groove
36C buffer space

The invention claimed is:
1. A gas solenoid valve, comprising:
a housing including a first port, a second port, and a valve port leading to the first port and the second port;
a main valve body capable of moving between a closed position and an open position and configured to move in an opening direction by pressure of gas supplied through the first port, the closed position being a position of the main valve body closing the valve port, the open position being a position of the main valve body opening the valve port;
a guide member disposed having one end facing the valve port, the guide member including an inner hole in which the main valve body is inserted to guide the main valve body between the closed position and the open position;
a first biasing member that is disposed in a housing space and biases the main valve body in the opening direction, the housing space being formed inward of the guide member to surround the main valve body;
a second biasing member that provides, to the main valve body, a biasing force opposing a biasing force of the first biasing member to position the main valve body in the closed position; and
an electromagnetic drive device that generates an excitation force to cause the main valve body to move to the open position, the excitation force opposing the biasing force of the second biasing member, wherein:
the housing space is spaced apart from the one end of the guide member in the opening direction; and
the guide member includes, at the one end of the guide member, a buffer groove that surrounds an opening end of the inner hole of the guide member.
2. The gas solenoid valve according to claim 1, further comprising:
a seat piston that is inserted through the main valve body, receives the biasing force of the second biasing member, and biases the main valve body to the closed position, wherein:
a pilot passage connecting the first port and the second port is formed in the main valve body;
the seat piston is capable of moving between a pilot closed position and a pilot open position, the pilot closed position being a position of the seat piston closing the pilot passage, the pilot open position being a position of the seat piston opening the pilot passage; and
the electromagnetic drive device generates the excitation force to cause the seat piston to move to the pilot open position, to cause the main valve body to move to the open position.
3. The gas solenoid valve according to claim 1, wherein:
a depressurization passage is formed in at least one of the main valve body and the guide member; and
the depressurization passage is formed to allow the gas in the housing space to be discharged.

4. The gas solenoid valve according to claim 1, wherein:
the guide member includes at least one communication channel to guide, to the second port, the gas guided through the valve port in the open position; and
the at least one communication channel is formed at the one end of the guide member and arranged to make a distribution of flow rates of the gas flowing in the at least one communication channel asymmetric at the one end of the guide member.

* * * * *